United States Patent
Yoshida

(10) Patent No.: US 8,118,605 B2
(45) Date of Patent: Feb. 21, 2012

(54) BUS BAR ASSEMBLY AND VEHICLE ROOM LAMP HAVING THE SAME

(75) Inventor: Kosuke Yoshida, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/929,377

(22) Filed: Jan. 20, 2011

(65) Prior Publication Data

US 2011/0189871 A1     Aug. 4, 2011

(30) Foreign Application Priority Data

Feb. 3, 2010   (JP) .................................. 2010-021841

(51) Int. Cl.
   *H01R 12/00*       (2006.01)
(52) U.S. Cl. ...................................... 439/76.2
(58) Field of Classification Search ................. 439/76.2, 439/76.1, 949, 55, 66
   See application file for complete search history.

(56) References Cited

U.S. PATENT DOCUMENTS

| | | | |
|---|---|---|---|
| 2005/0258764 A1 | 11/2005 | Nagai et al. | |
| 2009/0242266 A1* | 10/2009 | Sasaki et al. ................. | 174/520 |
| 2010/0066350 A1* | 3/2010 | Matsumura et al. .......... | 324/120 |
| 2010/0226140 A1* | 9/2010 | Mochizuki ..................... | 362/373 |
| 2011/0148191 A1* | 6/2011 | Nakamura et al. ........... | 307/10.1 |
| 2011/0169956 A1* | 7/2011 | Deline et al. .................. | 348/148 |
| 2011/0186327 A1* | 8/2011 | Yoshida ........................ | 174/68.2 |

FOREIGN PATENT DOCUMENTS

JP        2005-329883 A        12/2005

* cited by examiner

*Primary Examiner* — Tulsidas C Patel
*Assistant Examiner* — Phuong Nguyen
(74) *Attorney, Agent, or Firm* — Edwards Wildman Palmer LLP

(57) ABSTRACT

A bus bar assembly 1 as a component of a vehicle room lamp 10 includes: a housing 2; and bus bars 3a, 3b, 3c, 3f insert-molded into housing 2. Each of bus bars 3a, 3b, 3c includes: a press-connecting portion 4 composed of a bottom wall 40, and a press-connecting blade 41 vertically extended from an edge of bottom wall 40, and electrically connected to an electric wire 8 by press-connecting; a wiring portion 5 extended from the edge of bottom wall 40 along a planar direction of bottom wall 40; and an impact-absorbing portion 6 disposed around the press-connecting portion 4 for absorbing an impact generated by press-connecting electric wire 8 with press-connecting blade 41. The impact-absorbing portion 6 is extended from an edge 5b of wiring portion 5 along the planer direction of the bottom wall 40, and embedded in housing 2.

6 Claims, 4 Drawing Sheets

BUS BAR ASSEMBLY AND VEHICLE ROOM LAMP HAVING THE SAME

CROSS REFERENCE TO RELATED APPLICATIONS

This application is on the basis of Japanese Patent Application No. 2010-021841, the contents of which are hereby incorporated by reference.

BACKGROUND OF THE INVENTION

1. Field of the Invention

The present invention relates to a bus bar assembly made by insert-molding the bus bar into a housing, and to a vehicle room lamp having the bus bar assembly.

2. Description of the Related Art

As a conventional vehicle room lamp attached to a ceiling of a vehicle, a room lamp is known to be made by assembling a bus bar, which is made by punching and bending a metal plate, into a synthetic-resin-made housing (for example, see Patent Document 1). FIG. 5 is a perspective view showing a bus bar as a component of a conventional vehicle room lamp.

As shown in FIG. 5, a bus bar 103 is provided with a plurality of press-connecting portions 104 with which an electric wire is press-connected, a pair of component-attaching portions 107 to which a bulb as a light source is attached, a plurality of contact points 108 which are electrically connected to a switch for switching a power supply from the electric wire to the bulb, a plurality of wiring portions 105 which connect the press-connecting portions 104, the component-attaching portions 107, and the contact points 108 according to a specific pattern, a plurality of locking claws 102 which are pressed into and locked with the housing, and a bridge portion 109 which connects the wiring portions 105 to each other.

Each press-connecting portion 104 is composed of a bottom wall 140, and a pair of press-connecting blades 141 vertically extended from both edges of the bottom wall 140. The electric wire is press-connected with the pair of press-connecting blades 141, and electrically connected to the pair of press-connecting blades 141.

Each of the component-attaching portions 107 is provided with a plate portion 170 continued to the wiring portions 105, and a pair of clipping portions 171 continued to both edges of the plate portion 170. A one end of the bulb is clipped between the pair of clipping portions 171 of the one of the component-attaching portions 107, and the other end of the bulb is clipped between the pair of clipping portions 171 of the other one of the component-attaching portions 107, thereby the bulb is electrically connected to the pair of component-attaching portions 107.

Each of the wiring portions 105 is formed in a band shape having a constant width, and arranged along a surface of the housing.

The locking claws 102 are extended vertically from edges of the wiring portions 105 or the like, and as described above, pressed into and locked with the housing.

The bridge portion 109 is configured to ease an assembly of the bus bar 103 with the housing, and after the bus bar 103 is assembled with the housing, the bridge portion 109 is cut off and removed.

A vehicle room lamp having the above-described bus bar 103 is assembled as follows. Firstly, the bus bar 103 made by punching and bending a metal plate is assembles with the housing by pressing the locking claws 102 into the housing and locking the locking claws 102 with the housing. Next, the bridge portions 109 are cut off and removed. Then, the bulb is attached to the pair of component-attaching portions 107, and the electric wire is press-connected with the press-connecting portions 104. Lastly, a cover is attached to the housing. Thus, the vehicle room lamp is assembled.

[Patent Document 1] JP, A, 2005-329883

However, there are problems described below in the conventional vehicle room lamp having the bus bar 103. When the electric wire is press-connected with the press-connecting portions 104, due to an impact generated by the press-connecting operation, the press-connecting portions 104 and the wiring portions 105 around the press-connecting portions 104 may be deformed. Further, in the above-described bus bar 103, the locking claws 102 are extended in a direction opposed to the extending direction of the press-connecting blades 141. Therefore, heights of the bus bar 103 and the housing become large, and the assembling condition with a vehicle is regulated. Further, in the above-described bus bar 103, when assembling with the housing, the number of assembling man-hours is large such that a plurality of locking claws 102 are pressed into and locked with the housing, and the bridge portion 109 is cut off and removed, thereby an assembling cost is increased.

These problems are not limited to the vehicle room lamp, but to the other electronic devices having the above-described bus bar and the housing.

Accordingly, an object of the present invention is to provide a bus bar assembly configured to prevent press-connecting portions and the surroundings from being deformed generated by press-connecting an electric wire, and to prevent the height of a bus bar from being enlarged, and to reduce assembling man-hours, and to provide a vehicle room lamp having the bus bar assembly.

SUMMARY OF THE INVENTION

In order to attain the object, according to the present invention, there is provided a bus bar assembly including:

a housing; and a bus bar made by punching and bending a metal plate and by insert-molding into the housing, wherein the bus bar includes:

a press-connecting portion composed of a bottom wall and a press-connecting blade extended vertically from an edge of the bottom wall, and electrically connected to an electric wire by press-connecting the electric wire with the press-connecting blade;

a wiring portion extended along a planar direction of the bottom wall from the edge of the bottom wall; and an impact-absorbing portion disposed around the press-connecting portion and absorbing an impact generated by press-connecting the electric wire with the press-connecting blade, and wherein the impact-absorbing portion is extended in a planar direction of the bottom wall, and embedded in the housing.

Preferably, the impact-absorbing portion is extended from an edge of the bottom wall or an edge of the wiring portion, and embedded in the housing in a manner that a part of a surface of the impact-absorbing portion is exposed.

Preferably, the impact-absorbing portion is made by folding an extended portion from the edge of the bottom wall in a manner that a folded portion is overlapped with the bottom wall.

According to another aspect of the present invention, a vehicle room lamp is equipped with the bus bar assembly of the present invention.

These and other objects, features, and advantages of the present invention will become more apparent upon reading of the following detailed description along with the accompanied drawings.

DETAILED DESCRIPTION OF THE PREFERRED EMBODIMENTS

First Embodiment

A vehicle room lamp 10 having a bus bar assembly 1 according to a first embodiment of the present invention will be explained with reference to FIGS. 1 to 3. The vehicle room lamp 10 of the present invention illuminates a vehicle cabin by attaching to a lamp-attachment opening provided on a roof trim as an interior walling covering a vehicle panel of a vehicle.

Figure 1:
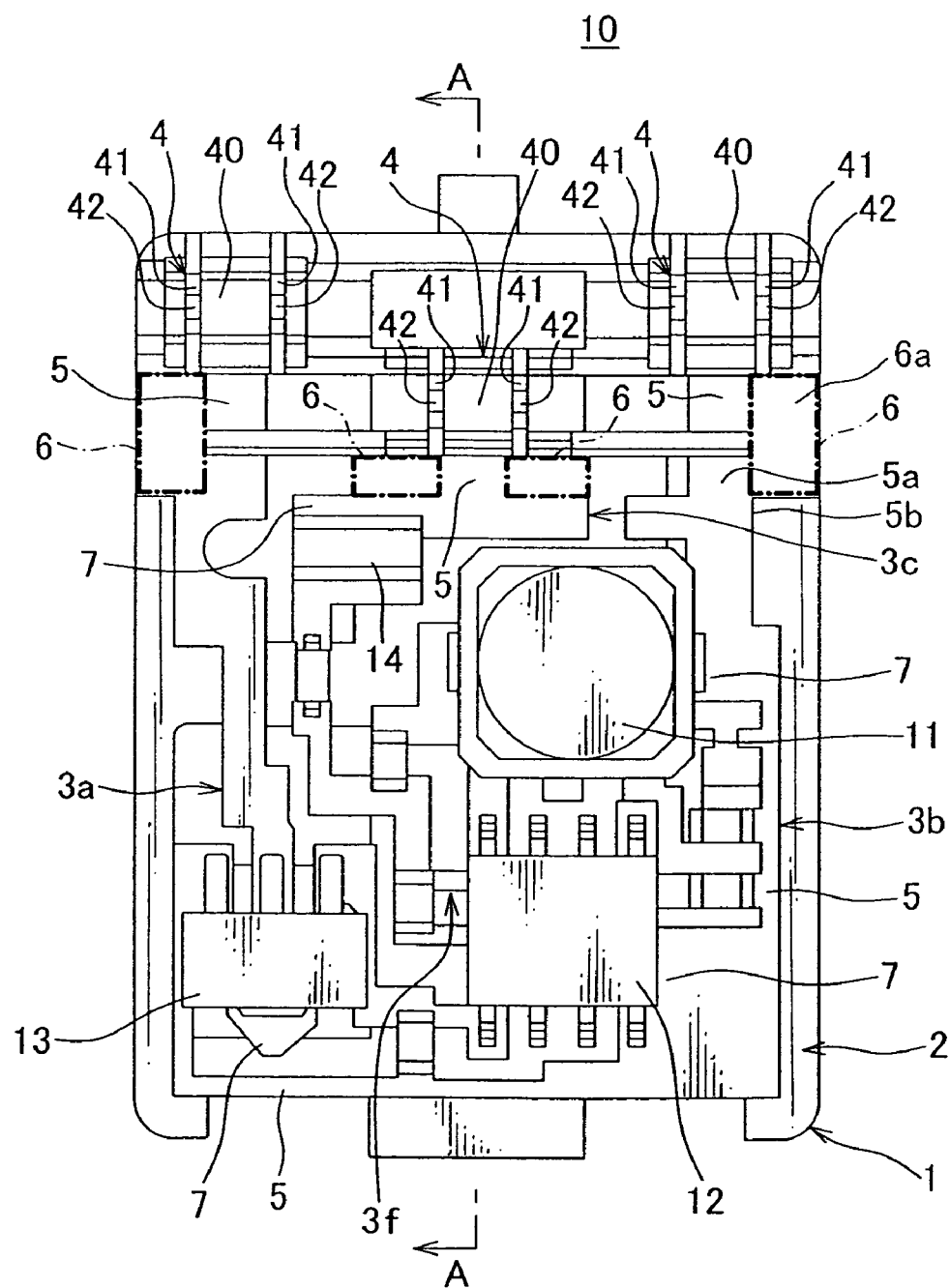
FIG. 1 is a plan view showing a bus bar assembly and a vehicle room lamp having a bus bar according to a first embodiment of the present invention.
Figure 2:
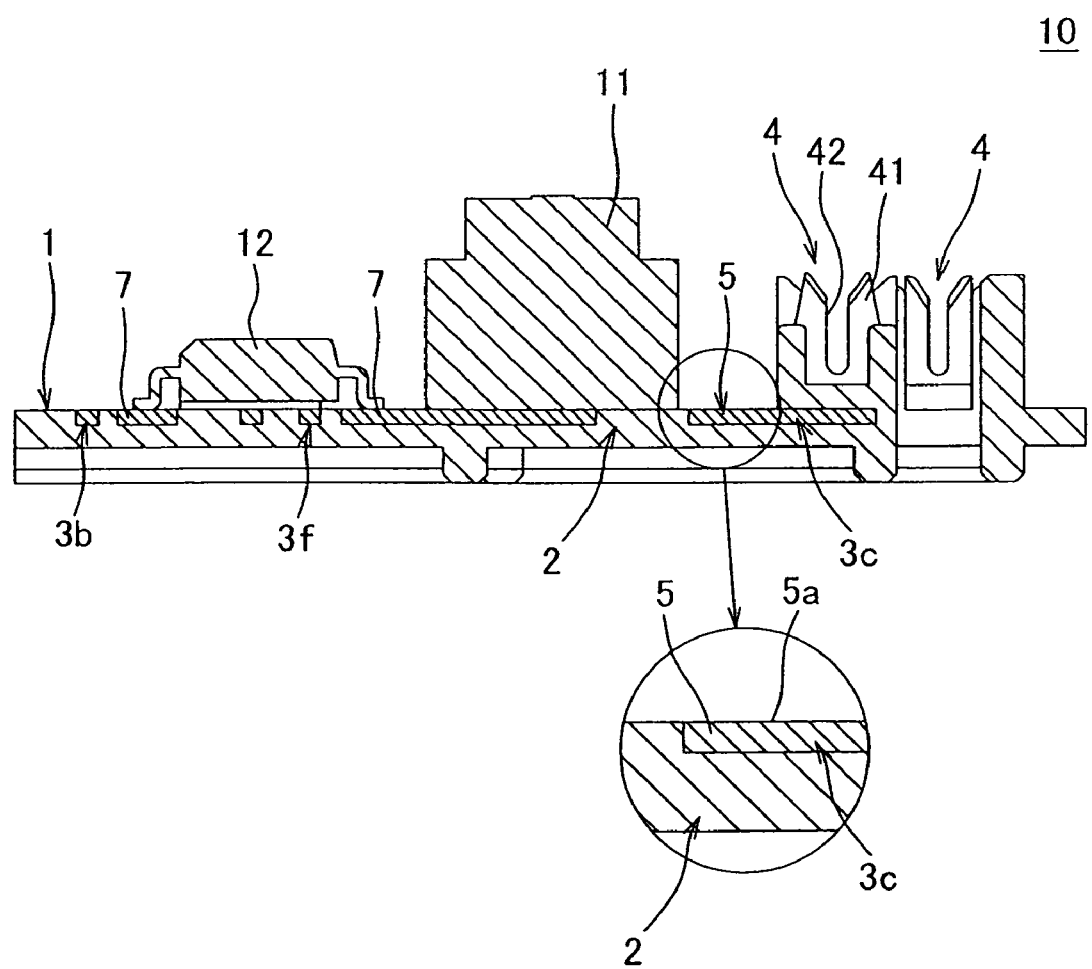
FIG. 2 is a sectional view taken on line A-A of FIG. 1.

As shown in FIGS. 1 and 2, the vehicle room lamp 10 includes: the bus bar assembly 1 composed of a plurality of bus bars 3a, 3b, 3c, 3f insert-molded into a synthetic-resin-made housing 2; a plurality of electronic components 11, 12, 13, 14 surface-mounted on the bus bars 3a, 3b, 3c, 3f; a not-shown switch for turning on and off the vehicle room lamp 10; and a not-shown cover attached to the housing 2. The electronic component 11 is an LED lamp as a light source.

The vehicle room lamp 10 is attached to the lamp-attachment opening in a direction opposed to a direction shown in FIG. 2. A height of the vehicle room lamp 10 indicates a size of the vehicle room lamp 10 in a vertical direction of FIG. 2. Namely, the height of the vehicle room lamp 10 indicates a size of the vehicle room lamp 10 along a vertical direction of a press-connecting blade 41 from a bottom wall 40.

The plurality of bus bars 3a, 3b, 3c, 3f are made by punching and bending a metal plate. Each of the bus bars 3a, 3b, 3c, and 3f includes: a component-attaching portion 7 to which a lead portion or the like of the electronic components 11, 12, 13, 14 is attached; and a wiring portion 5. Further, each of the bus bars 3a, 3b, and 3c further includes: a press-connecting portion 4 with which an electric wire 8 is press-connected and electrically connected; and an impact-absorbing portion 6 for absorbing an impact generated by press-connecting of the electric wire 8.

Figure 3:
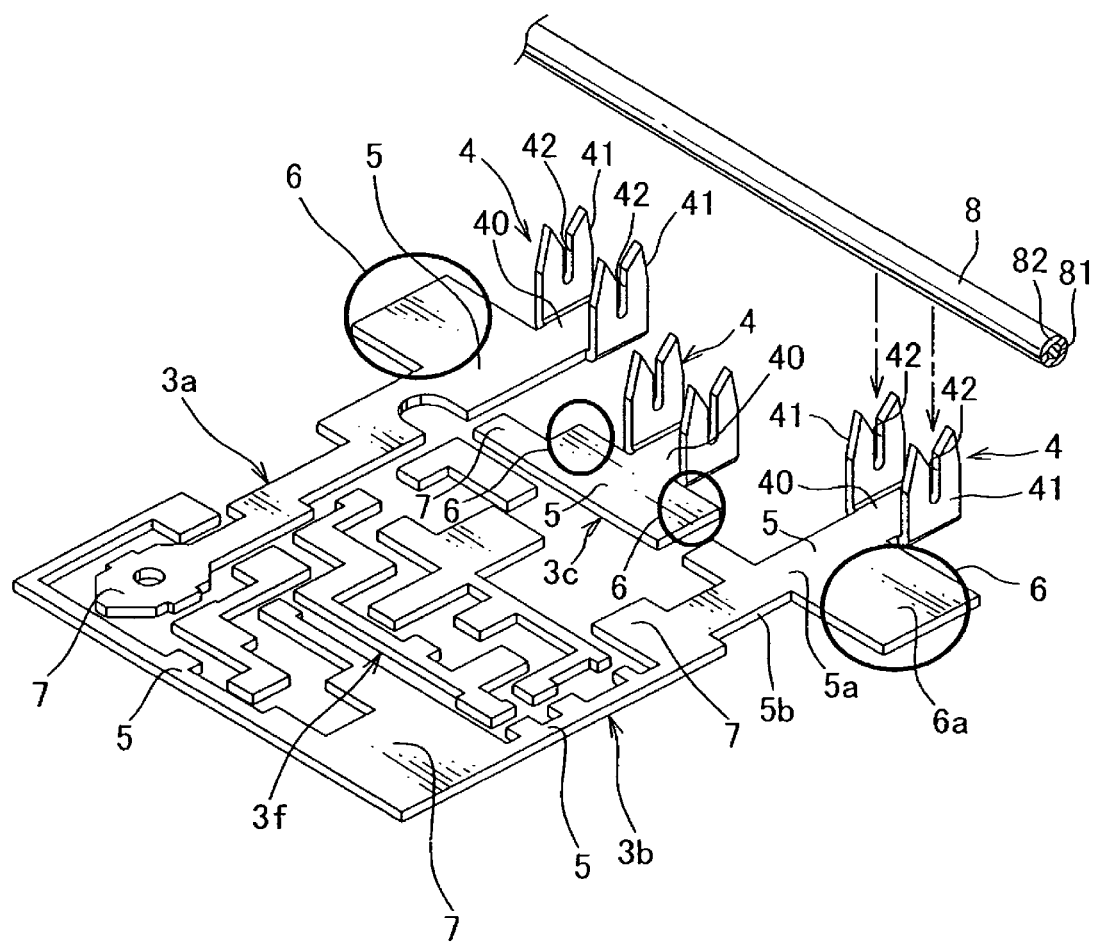
FIG. 3 is a perspective view showing the bus bar of FIG. 1.

As shown in FIGS. 2 and 3, the component-attaching portion 7 is formed in a flat plate shape. Further, as shown in FIG. 2, the component-attaching portion 7 is embedded in the housing 2 in a manner that a one surface of the component-attaching portion 7 is exposed. The lead portion or the like of the electronic components 11, 12, 13, 14 is attached to the one surface of the component-attaching portion 7. According to the present invention, the phrase "the component-attaching portion 7 is embedded in the housing 2" means that the component-attaching portion 7 is buried in the housing 2 and adheres to the housing 2. The lead portion of the electronic components 11, 12, 13, 14 is electrically connected to the one surface of the component-attaching portion 7 with solder or the like.

Thus, in the vehicle room lamp 10, because the electronic components 11, 12, 13, 14 are surface-mounted on the bus bars 3a, 3b, 3c, 3f, an increase of the height of the vehicle room lamp 10 is prevented.

As shown in FIGS. 2 and 3, the press-connecting portion 4 includes: a flat-plate-shaped bottom wall 40; and a pair of press-connecting blades 41 vertically extended from both edges of the bottom wall 40 and facing to each other. Further, a slit 42 into which the electric wire 8 is inserted is provided on each press-connecting blade 41. Further, the bottom wall 40 of the press-connecting portion 4 is embedded in the housing 2, and the pair of press-connecting blades 41 is projected from a surface of the housing 2. When the electric wire 8 is inserted into the slit 42, the pair of press-connecting blades 41 breaks through a cover 82 of the electric wire 8, contacts a core wire 81, and electrically connected to the core wire 81. Namely, the electric wire 8 is press-connected with the press-connecting portion 4 or the press-connecting blades 41.

As shown in FIG. 3, the electric wire 8 is a covered electric wire having a round section made of a conductive core wire 81 covered by an insulating cover 82. This electric wire 8 is connected to an electric source, and by connecting to the press-connecting portion 4, supplies an electric power to the LED lamp 11 and the like.

The wiring portion 5 is arranged between the component-attaching portion 7 and the other component-attaching portion 7, or arranged between the bottom wall 40 of the press-connecting portion 4 and the component-attaching portion 7. The wiring portion 5 is formed in a band shape, and disposed on the same plane as the component-attaching portion 7 and the bottom wall 40. Namely, the wiring portion 5 is extended from an edge of the bottom wall 40 along a planar direction of the bottom wall 40, and extended from an edge of the component-attaching portion 7 along a planar direction of the component-attaching portion 7. As shown in FIG. 2, this wiring portion 5 is embedded in the housing 2 in a manner that one surface 5a is exposed. Further, the one surface 5a is disposed in the same plane as the one surface on which the lead portion or the like of the component-attaching portion 7 is attached, and as the surface of the bottom wall 40 from which the press-connecting blade 41 is extended vertically.

As shown in FIGS. 1 and 3, the impact-absorbing portion 6 is extended from an edge 5b of the wiring portion 5 disposed around the press-connecting portion 4 along the planar direction of the wiring portion 5, namely, the planar direction of the bottom wall 40. Further, in the bus bars 3a, 3b, the impact-absorbing portion 6 is extended from one edge 5b in a width direction of the wiring portion 5. Further, in the bus bar 3c, the impact-absorbing portion 6 is extended from both edges in the width direction of the wiring portion 5. Further, the impact-absorbing portion 6 is embedded in the housing 2 in a manner that one surface 6a of the impact-absorbing portion 6 is exposed. Further, the one surface 6a is disposed on the same plane as the one surface on which the lead portion or the like of the component-attaching portion 7 is attached, and as the surface of the bottom wall 40 from which the press-connecting blade 41 is extended vertically.

Namely, the bus bars 3a, 3b, 3c of the present invention are provided with the impact-absorbing portion 6, and because the width of the impact-absorbing portion 6 around the press-connecting portion 4 is formed large, the strength of the press-connecting portion 4 and the strength around the press-connecting portion 4 are increased. Thereby, an impact generated by press-connecting the electric wire 8 with the press-connecting blade 41 is configured to be absorbed by the impact-absorbing portion 6, namely, a wide width portion. Therefore, when the electric wire 8 is press-connected with the press-connecting blade 41, the press-connecting portion 4 and an area around the press-connecting portion 4 are prevented from being deformed, and the electronic components 11, 12, 13, 14 attached to the component-attaching portions 7 are prevented from being removed from the component-attaching portion 7.

Further, the impact-absorbing portion 6 of the present invention is extended along the planar directions of the bottom wall 40 and the wiring portion 5, and embedded in the housing 2, namely, the impact-absorbing portion 6 is formed in a thin shape in a height direction. Thereby, increases of the heights of the bus bar assembly 1 and the vehicle room lamp 10 are prevented.

Further, because the impact-absorbing portion 6 is embedded in a manner that the one surface 6a is exposed, the heat generated in the bus bars 3a, 3b, 3c can be radiated from the one surface 6a to the air. Thereby, the bus bars 3a, 3b, 3c are cooled, and the heat generated in the bus bars 3a, 3b, and 3c is prevented from transferring to the electronic components 11, 12, 13, 14 molded on the component-attaching portion 7. Incidentally, when the housing 2 is made of thermally-conductive resin, the heat generated in the bus bars 3a, 3b, 3c can be radiated from the other surface of the impact-absorbing portion 6 to the housing 2.

Further, according to the bus bar assembly 1 of the present invention, by providing the impact-absorbing portions 6 in the bus bars 3a, 3b, 3c, a contact area between the bus bars 3a, 3b, 3c and the housing 2 can be increased. Therefore, when the electric wire 8 is press-connected with the press-connecting blade 41, the bus bars 3a, 3b, 3c are prevented from being removed from the housing 2.

Next, an assembling method of the vehicle room lamp 10 having the above-described structure will be explained. Firstly, the bus bars 3a, 3b, 3c, 3f are made by punching and bending a metal plate. Next, the bus bars 3a, 3b, 3c, 3f are positioned in a molding die of the housing 2, and resin is poured into the molding die to form the bus bar assembly 1 in which the bus bars 3a, 3b, 3c, 3f are insert-molded into the housing 2. Then, the electronic components 11, 12, 13, 14 and a switch are attached to the component-attaching portion 7 of the bus bar assembly 1. Then, the electric wire 8 is press-connected with the press-connecting portion 4.

Lastly, a cover is attached to the housing 2 to cover the bus bars 3a, 3b, 3c, 3f and the electronic components 11, 12, 13, 14. Thus, the vehicle room lamp 10 is assembled.

In this way, because the bus bar assembly 1 is made by insert-molding the bus bars 3a, 3b, 3c, 3f into the housing 2, it is unnecessary to assemble the bus bar with the housing as a conventional product.

According to the present invention, there is provided the bus bar assembly 1 and the vehicle room lamp 10 able to prevent the press-connecting portion 4 and the area around the press-connecting portion 4 from being deformed when the electric wire 8 is press-connected, to prevent the height thereof from being enlarged, and to reduce the assembling man-hours.

Second Embodiment

A bus bar assembly according to a second embodiment of the present invention will be explained with reference to FIG. 4. Incidentally, in FIG. 4, the same components as the first embodiment are assigned the same reference signs and an explanation thereof is omitted.

Figure 4:
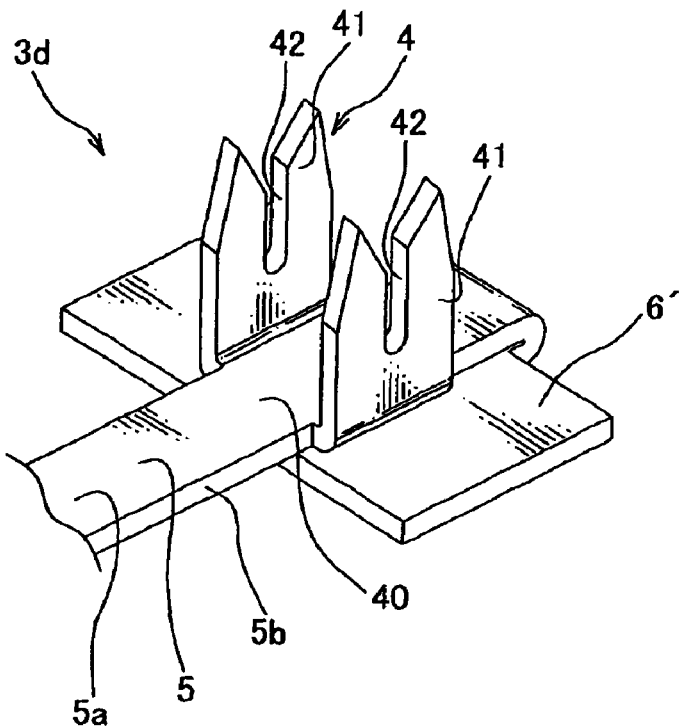
FIG. 4 is a perspective view showing a bus bar according to a second embodiment of the present invention.
Figure 5:
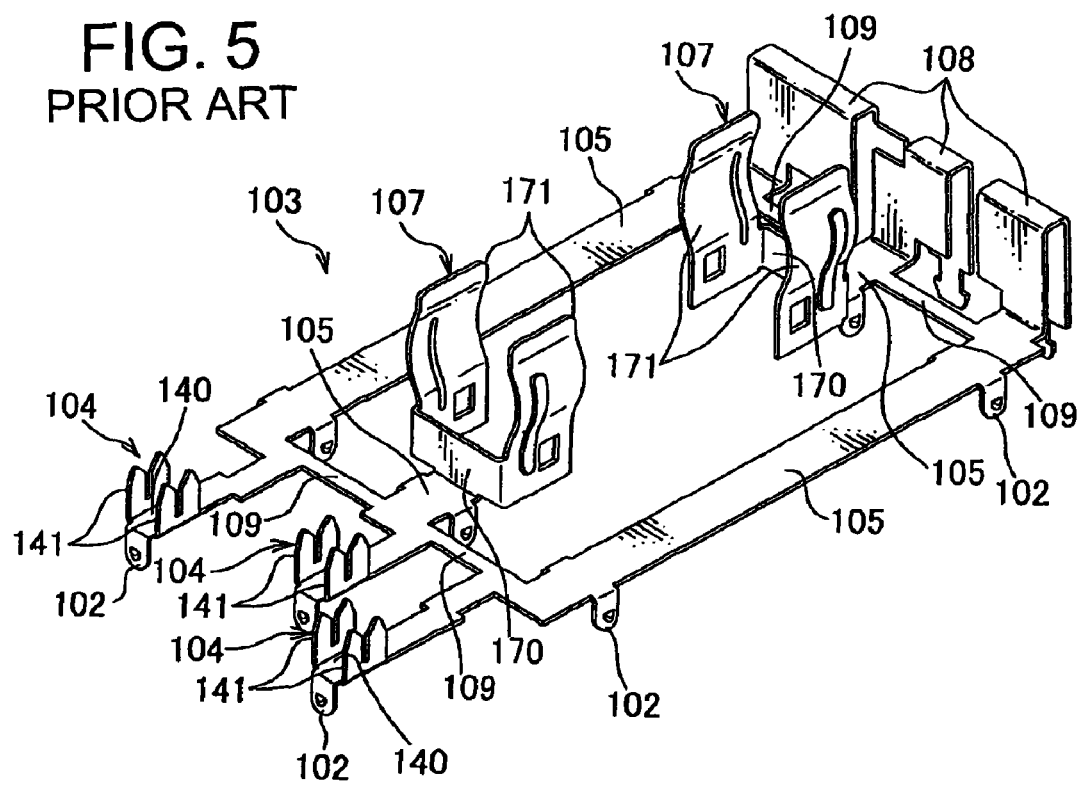
FIG. 5 is a perspective view showing a conventional bus bar as a component of a vehicle room lamp.

The bus bar assembly of this embodiment includes a bus bar 3d having an impact-absorbing portion 6' shown in FIG. 4 instead of the bus bar 3a of the bus bar assembly 1 (see FIG. 1). The structure of the bus bar assembly of this embodiment is the same as the bus bar assembly 1 except the impact-absorbing portion 6'.

The impact-absorbing portion 6' is made by bending a portion extended from the edge of the press-connecting portion 4 in an opposite direction of the wiring portion 5 in a manner that the portion is overlapped with the bottom wall 40. Further, the extended portion is bent in a direction opposite to the press-connecting blade 41. Namely, the impact-absorbing portion 6' is formed in a plate shape extended along the planar direction of the bottom wall 40 for reducing the height thereof. Further, the whole of the impact-absorbing portion 6' is embedded in the housing 2.

According to the bus bar 3d of the present invention, because the area around the press-connecting portion 4 is formed wide, and the area around the press-connecting portion 4 is formed thick, the strengths of the press-connecting portion 4 and the area around the press-connecting portion 4 are increased, and the impact-absorbing portion 6' is configured to absorb the impact generated by press-connecting the electric wire 8 with the press-connecting blade 41. Therefore, when the electric wire 8 is press-connected with the press-connecting blade 41, the press-connecting portion 4 and the area around the press-connecting portion 4 are surely prevented from being deformed.

Further, the impact-absorbing portion of the present invention may be formed in a plate shape extended from the edge of the bottom wall 40 along the planar direction of the bottom wall 40 (namely, the impact-absorbing portion 6' shown in FIG. 4 is not bent, and extended straight) other than the above-described impact-absorbing portions 6, 6'.

Further, the bus bar assembly of the present invention can be used in the electronic devices other than the vehicle room lamp 10.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A bus bar assembly comprising:
    a housing; and
    a bus bar made by punching and bending a metal plate and by insert-molding into the housing,
    wherein the bus bar includes:
    a press-connecting portion composed of a bottom wall and a press-connecting blade extended vertically from an edge of the bottom wall, and electrically connected to an electric wire by press-connecting the electric wire with the press-connecting blade;
    a wiring portion extended along a planar direction of the bottom wall from the edge of the bottom wall; and
    an impact-absorbing portion disposed around the press-connecting portion and absorbing an impact generated by press-connecting the electric wire with the press-connecting blade, and
    wherein the impact-absorbing portion is extended in a planar direction of the bottom wall, and embedded in the housing.

2. A vehicle room lamp equipped with the bus bar assembly as claimed in claim 1.

3. The bus bar assembly as claimed in claim 1,
wherein the impact-absorbing portion is extended from an edge of the bottom wall or an edge of the wiring portion, and embedded in the housing in a manner that a part of a surface of the impact-absorbing portion is exposed.

4. A vehicle room lamp equipped with the bus bar assembly as claimed in claim 3.

5. The bus bar assembly as claimed in claim 1,
wherein the impact-absorbing portion is made by folding an extended portion from the edge of the bottom wall in a manner that a folded portion is overlapped with the bottom wall.

6. A vehicle room lamp equipped with the bus bar assembly as claimed in claim 5.

* * * * *